United States Patent [19]

Hepp

[11] 4,436,860

[45] Mar. 13, 1984

[54] REINFORCED THERMOPLASTIC COMPOSITION

[75] Inventor: Leonard R. Hepp, Evansville, Ind.

[73] Assignee: General Electric Company, Pittsfield, Mass.

[21] Appl. No.: 497,503

[22] Filed: May 24, 1983

Related U.S. Application Data

[63] Continuation of Ser. No. 316,948, Oct. 30, 1981, abandoned.

[51] Int. Cl.$^3$ .............................................. C08K 3/40
[52] U.S. Cl. ................................ 524/394; 523/455; 524/494; 524/539
[58] Field of Search ..................... 524/394, 539, 494

[56] References Cited

U.S. PATENT DOCUMENTS

| | | | |
|---|---|---|---|
| 2,465,319 | 3/1949 | Whinfield et al. | 526/71 |
| 3,368,995 | 2/1968 | Furukawa et al. | 524/381 |
| 3,516,597 | 6/1970 | Gray et al. | 524/494 |
| 3,833,685 | 9/1974 | Wambach | 524/409 |
| 3,953,394 | 4/1976 | Fox et al. | 524/86 |
| 4,327,007 | 4/1982 | Vanderkooi et al. | 524/394 |
| 4,351,758 | 9/1982 | Lu et al. | 524/227 |
| 4,368,286 | 11/1983 | Hayashi et al. | 524/394 |

FOREIGN PATENT DOCUMENTS 46642 3/1982 European Pat. Off. .

*Primary Examiner*—Lewis T. Jacobs
*Attorney, Agent, or Firm*—Hedman, Gibson, Costigan & Hoare

[57] ABSTRACT

Improved heat-resistant composition producing injection molded workpieces which are opaque and crystalline in thin, thick and large/flat parts comprise a combination consisting predominantly of poly(ethylene terephthalate) with a lesser proportion of poly(1,4-butylene terephthalate), such combination being reinforced with filamentous glass and, optionally, but preferably, containing an internal nucleating amount of sodium stearate.

6 Claims, No Drawings

REINFORCED THERMOPLASTIC COMPOSITION

This is a continuation of application Ser. No. 316,948 filed Oct. 30, 1981 abandoned.

The present invention relates to molding compositions comprising mixed polyesters reinforced with glass. More particularly, it relates to rapidly crystallizing blends comprising poly(ethylene terephthalate) and a minor proportion of poly(1,4-butylene terephthalate), reinforced with filamentous glass and optionally, but preferably, internally nucleated with sodium stearate.

BACKGROUND OF THE INVENTION

Fox and Wambach, U.S. Pat. No. 3,953,394 disclose polyester alloys comprising from 1 to 99 parts by weight of poly(ethylene terephthalate) and from 99 to 1 part of poly(1,4-butylene terephthalate). The alloys can be injection molded into parts which do not delaminate when cooled. Fox annd Wambach also describe such alloys reinforced with fillers, including filamentous glass and also flame retardant modifications of such compositions.

The present invention is based on the discovery of an unusual effect of poly(1,4-butylene terephthalate) in 15% glass reinforced poly(ethylene terephthalate)/poly(1,4-butylene terephthalate) polyblends. It has been found that if the poly(ethylene terephthalate) level in 15% glass reinforced blends with poly(1,4-butylene terephthalate) is increased by 10% increments, very little effect on the physical properties of molded parts is evident until the 60–70% poly(ethylene terephthalate)/40–30% poly(1,4-butylene terephthalate) range is reached. In this range, a rapid drop in heat distortion temperature (DTUL-deflection temperature under load, ASTM Test D648) at 264 psi occurs. This rapid drop can, however, be moved into higher poly(ethylene terephthalate)/lower poly(1,4-butylene terephthalate) levels by increasing the mold temperature used for making the workpieces. This reflects a strong effect of poly(1,4-butylene terephthalate) on the crystallization of the poly(ethylene terephthalate) in the polyblends, and was apparently not recognized by Fox and Wambach. There is an improved control in warpage at higher poly(ethylene terephthalate) levels and the property profile remains unaffected at these levels. This unusual effect is due to enhanced crystallinity and will be documented hereinafter.

Once the foregoing strong effect on crystallinity had been discovered, numerous experiments were carried out to determine the effectiveness of internal nucleating agents. Fox and Wambach disclose, broadly, that nucleating agents will improve their polyester alloys, especially those having higher ratios of poly(ethylene terephthalate). Many of the nucleating agents suggested were tried, but only one, not specifically mentioned, sodium stearate, has been found to produce good heat distortion values and physical properties coupled with the ability to produce opaque, crystalline specimens in thin, thick and large/flat parts after injection molding under conventional conditions.

In essence, the present invention provides superior molding compositions within the broad disclosure of the above-mentioned Fox and Wambach patent, which is incorporated herein by reference.

DESCRIPTION OF THE INVENTION

According to the present invention there is provided a reinforced thermoplastic composition which has a high deflection temperature under load at 264 psi and which molds into opaque, crystalline specimens in thin, thick and large/flat parts, said composition comprising:
(A) a stable, blended resinous combination comprising
  (a) from about 60 to about 90 parts by weight of a poly(ethylene terephthalate) resin and
  (b) from about 40 to about 10 parts by weight of a poly(1,4-butylene terephthalate) resin or a copolyester thereof with a minor amount of an aliphatic or aromatic dicarboxylic acid or an aliphatic polyol and
(B) from about 5 to about 60 parts by weight per 100 parts by weight of said composition of reinforcing filamentous glass.

Also contemplated is a preferred embodiment which is a composition as defined above which also includes:
(C) an internal nucleating amount of sodium stearate, alone, or in further combination with
(D) an effective property improving amount of an oxirane compound.

When used herein, and in the appended claims, the term "in combination" and "resinous combination" contemplates resins which alloy with each other and which remain intimately combined when cooled and solidified. Moreover, in all of the present compositions, the combinations are "stable" in the sense that, once formed, the alloys stay permanently homogenous. Therefore, unstable combinations in which resinous components (a) and (b) either delaminate or separate when cooled, or in which the gross physical properties, chemical resistance, macroscopic appearance, and the like, clearly manifest failure to form stable alloys, are excluded from this invention.

The poly(ethylene terephthalate) resin component (a) is disclosed in Whinfield et al. U.S. Pat. No. 2,465,319. Such polymeric linear terephthalic esters are composed of recurring structural units of the formula:

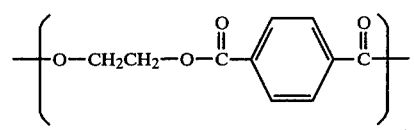

Such polyesters will have molecular weights high enough to be film- and fiber-formers. Poly(ethylene terephthalate) resins can be made following the teachings of the Whinfield et al patent above-mentioned, incorporated herein by reference and are available from a number of sources.

Preferred polyester resins for component (b) will be of the family consisting of high molecular weight, polymeric 1,4-butylene glycol terephthalates having repeating units of the general formula:

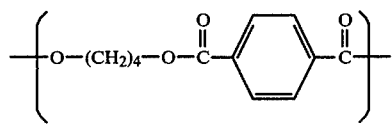

Also contemplated are mixtures of such esters with minor amount, e.g., from 0.5 to 2% by weight, of units derived from aliphatic or aromatic dicarboxylic acids and/or aliphatic polyols, e.g., glycols, i.e., copolyesters. These can also be made following the teachings of the Whinfield et al patent, above-mentioned, suitably modified, if necessary. Poly(1,4-butylene terephthalate) is commercially available.

Especially preferred polyesters for use as component (b) are poly(1,4-butylene terephthalate) resins. Special mention is made of this polyester because it crystallizes at an especially rapid rate.

Among the units which can be present in the copolyesters are those derived from aliphatic dicarboxylic acids, e.g., of up to about 50 carbon atoms, including cycloaliphatic, straight and branched chain acids, such as adipic acid, cyclohexanediacetic acid, dimerized $C_{16}$-$C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acid and the like. In addition to the 1,4-butylene glycol units, there can also be minor amounts of units derived from other aliphatic glycols and polyols, e.g., of up to about 50 carbon atoms, including ethylene glycol, propylene glycol, glycerol, cyclohexanediol, and the like. Such copolyesters can be made by techniques well known to those skilled in the art.

Illustratively, sufficiently high molecular weight polyesters of type (a) will have an intrinsic viscosity of at least 0.2 and preferably about 0.4 deciliters/gram as measured in chlorophenol, a 60/40 phenol/tetrachloroethane mixture or a similar solvent at 25°–30° C., and for type (b) at least 0.6 and more preferably 0.8, same basis. The upper limit is not critical, but it will generally be about 1.5 dl./g. Especially preferred polyesters will have an intrinsic viscosity in the range of 0.5 to 1.0 for type (a) and 0.9 to 1.2 for type (b).

As noted above, poly(ethylene terephthalate) resins and poly(1,4-butylene terephthalate) and/or copolyester resins are combinable with each other in all proportions. Consequently, alloyed combinations comprising from 60 to 90 parts by weight of poly(ethylene terephthalate) and from 40 to 10 parts by weight of poly(1,4-butylene terephthalate) resins are included within the scope of the invention. In general, however, compositions containing about 70 parts by weight of the poly(ethylene terephthalate) and about 30 parts by weight of poly(1,4-butylene terephthalate) resins exhibit the best overall combination of properties and these concentrations are preferred. In general, the alloyed combination of polyester components (a) and (b) will comprise from about 40 to about 95 parts by weight and the filler will comprise from about 5 to about 60 parts by weight per 100 parts by weight of the total composition. In particular, the reinforcing filler is glass and it is preferred to use fibrous glass filaments comprised of lime-aluminum boro-silicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcements are made by mechanical pulling.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 inch and 0.125 (⅛) inch.

In general, best properties will be obtained if the sized filamentous glass reinforcement comprises from about 5 to about 60 parts by weight based on 100 parts of the combined weight of glass and polyesters and preferably about 25 to 50 parts by weight.

In preparing the compositions of this invention, it is important to use a polyester alloy which crystallizes very rapidly from the melt. Polyester alloys which meet the criterion of being rapidly crystallizable from the melt will be those which can be injection molded into a relatively cold mold at about 110° F. in a standard, short cycle time and produce a rigid workpiece which is highly crystalline throughout. As is described in Furukawa et al., U.S. Pat. No. 3,368,995, poly(ethylene terephthalate) alone, i.e. without nucleating agents will not produce such a workpiece because of its high crystalline melting point and low heat conductivity. Because such a polyester resin is not rapidly crystallizable, the outer part of the workpiece is amorphous, and the inner part, which is gradually cooled, is crystalline.

One convenient way to determine if a polyester alloy is suitable for use in this invention is to injection mold it with the mold temperature increased to 140°–160° F. in a standard short cycle, e.g. 10–90 seconds, into workpieces 1/16 to ½ inch thick. If the molded piece is rigid on removal from the mold and the inner and outer parts of the piece are uniformly milky or white and opaque and if the hardness, measured e.g., with a Rockwell M tester, is uniform throughout, crystallization from the melt is rapid enough to be suitable. If, on the other hand, the workpiece is clear, transparent or semitransparent (i.e., crystalline only on the inside); if the hardness is non-uniform throughout; if the workpiece is relatively soft on removal from the mold and brittle after it cools; or if uniformity can be achieved only by using a two stage molding cycle, or higher mold temperatures, e.g., 250°–330° F. and long times, e.g., 90–100 seconds, then the polyester resin alloy is not suitable for this invention.

It is to be noted that a precise range of concentration of the poly(ethylene terephthalate) component (2) is contemplated for the present alloys, i.e. 60 to 90 percent by weight of the resinous combination (A). The compositions having such concentrations of the poly(ethylene terephthalate) can be substantially improved by use of a nucleating agent. The prior art suggests a carbon powder, metal salts, clays, talc and the like.

None of these is satisfactory, however, if a combination of high heat distortion and high crystallinity after molding at 140°–160° F. mold temperatures is desired. After screening some 120 candidates, only sodium stearate appears to be suitable. This can be used in effective amounts, which can range from 0.1 to 3% based on the total compositions, preferably from 0.1 to 1.0 parts by weight based on 100 parts by weight of total composition.

Among the preferred embodiments are nucleated compositions which also include (D) a small effective property improving amount of an oxirane compound. These can vary widely in chemical nature, being characterized by the presence of at least one oxirane (epoxy) functional group. One useful member of the family is the diglycidyl ether of bisphenol-A. Others are available commercially from a number of sources, such as Dow Chemical Company, as DER 332, DER 661, and DER 667, and from Ciba-Geigy under the trade designation ARALDITE Epoxy. These can be used in amounts effective to permit high physicals to be retained, even after melt processing and molding. The amounts in general will range from about 0.05 to 3% based on the total weight of the composition, preferably from 0.1 to 0.5% by weight.

The compositions can also be rendered flame retardant with an effective amount of a conventional flame retardant agent. As is well known, flame retardants can be based on elementary red phosphorus, phosphorus compounds, halogen and nitrogen compounds alone or preferably in further combination with synergists, such as antimony compounds. Especially useful are polymeric and oligomeric flame retardant agents comprising tetrabromobisphenol-A carbonate units, see, for example, Wambach, U.S. Pat. No. 3,833,685, which is incorporated herein by reference.

The method of blending the alloys and compositions of this invention is not critical and can be carried out by conventional techniques. One convenient method comprises blending the polyesters in powder or granular form, extruding the blend and comminuting into pellets or other suitable shapes.

The reinforcements and other additives are added in any usual manner, e.g., by dry mixing or by mixing in the melted state in an extruder, on a heated mill or in other mixers.

It is always very important to thoroughly free all of the ingredients, the polyester resin(s), co-blending polymer, reinforcing filler, and flame retardant additives from as much water as possible.

In addition, compounding should be carried out to insure that the residence time in the machine is short, the temperature is carefully controlled; the frictional heat is utilized; and an intimate blend between the resin and the additives is obtained.

The compositions can be molded in any equipment conventionally used for reinforced thermoplastic compositions. For example, good results will be obtained in an injection molding machine, e.g., of the Van Dorn type, with conventional cylinder temperatures, e.g., 500° F. and conventional mold temperatures, e.g., 150° F. If necessary, depending on the molding properties of the co-blending polymer, the amount of reinforcing filler and the rate of crystallization of the polyester component, those skilled in the art will be able to make the conventional adjustments in molding cycles to accomodate the composition.

DESCRIPTION OF THE PREFERRED EMBODIMENT

The following examples illustrate the invention. They are set forth as a further description, but are not to be construed as limiting to the invention thereto.

EXAMPLES 1-2

The following ingredients are blended: poly(ethylene terephthalate) (PET), Goodyear VITUF 5900A; poly(1,4-butylene terephthalate) (PBT), General Electric VALOX 300, 0.9 dl./g., filamentous glass reinforcement, ⅛ inch. The blends are compounded in a 1¾ in. Sterling extruder at 520° F. The extrudate is pelletized and the pellets are molded at 490° F. (mold, 110° F.) into ASTM type test bars in a 3 oz. Van Dorn machine. The test bars are tested for the following physical properties: Tensile strength, ASTM D-1708, Flexural strength and modulus, ASTM D-790; Impact strength, ASTM D-256; and heat distortion temperature, ASTM D-648. Warpage is tested at room temperature and after annealing at 350° F. for 30 minutes and is expressed in deviation from flatness in millimeters on injection molded 1/16"×¼" side-gated discs using a mold temperature of 200° F. For control purposes, PET/PBT alloys outside the scope of the invention are prepared and tested, too. The compositions made and the properties obtained are set forth in Table 1.

TABLE 1

PHYSICAL PROPERTIES OF REINFORCED ALLOYS OF POLY (1,4-BUTYLENE TEREPHTHALATE) AND POLY (ETHYLENE TEREPHTHLATE)

| EXAMPLE | A* | B* | C* | D* | E* | F* | 1 | 2 | G* | H* | I* |
|---|---|---|---|---|---|---|---|---|---|---|---|
| Composition (parts by weight) | | | | | | | | | | | |
| poly(ethylene terephthalate) | 0 | 8.5 | 17 | 25.5 | 34 | 42.5 | 51 | 59.5 | 68 | 76.5 | 85 |
| poly(1,4-butylene terephthalate) | 85 | 76.5 | 68 | 59.5 | 51 | 42.5 | 34 | 25.5 | 17 | 8.5 | 0 |
| glass filamentous reinforcement | 15 | 15 | 15 | 15 | 15 | 15 | 15 | 15 | 15 | 15 | 15 |
| PROPERTIES | | | | | | | | | | | |
| Deflection temperature under load | | | | | | | | | | | |
| °F., 66 psi | 428 | 430 | 421 | 420 | 434 | 435 | 436 | 438 | 442 | 446 | 400 |
| °F., 264 psi | 379 | 384 | 378 | 358 | 360 | 349 | 351 | 231 | 182 | 186 | 170 |
| Warpage, room temperature, mm | 24 | 18 | 15 | 16 | 15 | 13 | 7 | 1 | 5 | 0 | 0 |
| annealed at 350° F. for 30 min, mm | 30 | 20 | 22 | 27 | 20 | 20 | 22 | 21 | 13 | 9 | 6 |
| Notched Izod impact strength (ft. lbs./in.) | 0.9 | 1.0 | 1.1 | 0.8 | 0.9 | 0.9 | 0.9 | 0.8 | 0.8 | 0.8 | 0.7 |
| Flexural strength, ($10^3$ psi) | 21.0 | 23.3 | 23.6 | 22.0 | 22.3 | 22.9 | 23.0 | 22.1 | 20.9 | 21.1 | 20.4 |
| Flexural modulus, ($10^6$ psi) | 0.6 | 0.7 | 0.8 | 0.6 | 0.7 | 0.7 | 0.7 | 0.7 | 0.7 | 0.7 | 0.7 |
| Tensile strength, ($10^3$ psi) | 12.3 | 13.4 | 15.1 | 12.8 | 13.2 | 13.3 | 13.6 | 12.7 | 12.5 | 13.1 | 12.9 |

*Control

The rapid drop in heat distortion values at 264 psi which becomes evident in the 60-70 PET/40-30 PBT range (Examples 1 and 2) can be moved into higher PET lower PBT levels by increasing mold temperature as shown in Table 2:

TABLE 2

HEAT DISTORTION (°F.) AT 264 PSI AS FUNCTION MOLD OF TEMPERATURE

| Ex. | | Mold Temperature; (°F.) | | |
|---|---|---|---|---|
| | | 110 | 140 | 160 |
| | 15% Glass Reinforced Polyblend | | | |
| 1 | 70% PET/30% PBT (as molded)* | 251 | 316 | 312 |
| | after 24 hours** | 251 | 305 | 344 |
| 2 | 80% PET/20% PBT (as molded)* | 190 | 191 | 204 |
| | after 24 hours** | 198 | 216 | 312 |

*Parts allowed to cool to room temperature for two hours prior to testing.
**Parts allowed to equilibrate at room temperature for 24 hours prior to testing.

It is seen that compositions according to Examples 1 and 2 can be molded into parts having excellent properties due to the desirable effect of small amounts of PBT on crystallinity in the polyblend.

EXAMPLE 3

The composition of Example 1 is intimately admixed with a number of inorganic salts, salts of organic acids, phosphate and sulfate salts, metals, organic compounds (alcohols, epoxides, peroxides, esters and ethers), polymeric additives, surfactants, inorganic fillers (including silicates, mica, aluminas, talc, graphite, and others) and salts of phenol and its additives. These are added at a loading level of 0.5% and examined as potential nucleating agents by molding into specimens and checking heat distortion at 264 psi and the appearance of various thin, thick and large/flat injection molded specimens, comparing transparent and amorphous vs opaque and crystalline areas. Only sodium stearate is found to give opaque, crystalline specimens in thin, thick and large/flat parts, coupled with excellent physical properties. The compositions, which also contain small, conventional amounts of stabilizers and mold release agents, are molded at 110° F. mold temperature and tested and the properties are summarized in Table 3.

TABLE 3

PET/PBT 15% GR COMPOSITION INTERNALLY NUCLEATED WITH SODIUM STEARATE

| EXAMPLE | 2 | 3 |
|---|---|---|
| Composition (parts by weight) | | |
| Poly(ethylene terephthalate)$^a$ | 59.3 | 59.05 |
| Poly(1,4-butylene terephthalate)$^b$ | 25.4 | 25.15 |
| Glass filamentous reinforcement$^c$ | 15 | 15 |
| Sodium stearate | 0 | 0.5 |
| PROPERTIES | | |
| Heat distortion, °F. at 264 psi | 204 | 378 |
| Notched Izod, ft lbs./in. | 0.89 | 0.99 |
| Unnotched Izod, ft. lbs./in. | 4.64 | 3.60 |
| Specific gravity, g./cm.$^3$ | 1.44 | 1.48 |
| Shrink, mils/in | | |
| with flow | 5.4 | 5.6 |
| cross flow | 5.5 | 8.1 |
| Melt viscosity, poise, pellets at 510° F. | 4,430 | 2,520 |

$^a$Vituf 5900A;
$^b$VALOX 300 (General Electric);
$^c$Owens Corning Fiberglas 419BB ⅛" chopped strand.

The physical appearance of Example 3 was superior to Example 2 after molding in a "cold mold" into 60 mil 1/16"×½"×5" flame bars, ⅛"×¼" Gardner chips and ¼"×½"×5" heat distortion bars. For Example 3, the flame bar is totally opaque, with no transparent edges, the Gardner chip is totally opaque with no transparent edges, and the heat distortion bar is totally opaque with no transparent edges. For Example 2, the flame bar is partially opaque near the gate with the bulk of the part transparent; the Gardner chip is partially opaque particularly near the gate and in the center of the part; however the bulk of the part is transparent; and the heat distortion part is partially opaque particularly in the center of the bar. The bar is no longer flat but rather is curved at the ends. Sink marks/areas are evident. Example 2 can be improved by increasing mold temperature to 140°–160° F.

EXAMPLES 3-8

Compositions are prepared molded and tested by the general procedures of Examples 1 and 2 with the following results:

TABLE 4

PET/PBT COMPOSITIONS

| (parts by weight) | EXAMPLE | | | | | |
|---|---|---|---|---|---|---|
| | 3 | 4 | 5$^f$ | 6$^f$ | 7$^f$ | 8$^g$ |
| Composition (parts by weight) | | | | | | |
| Poly(ethylene terephthalate)$^{(a)}$ | 48.6 | 48.4 | 38.2 | 31.2 | 62.5 | 42.2 |
| Poly(1,4-butylene terephthalate)$^{(b)}$ | 20.8 | 20.8 | 16.4 | 13.4 | 6.9 | 18.0 |
| Glass filamentous reinforcement | 30.0 | 30.0 | 45 | 55 | 30 | 7.5 |
| Sodium stearate | 0.5 | 0.5 | 0.5 | 0.5 | 0.5 | — |
| Oxirane compound$^{(d)}$ | — | 0.25 | — | — | 0.25 | — |
| Flame retardant additives$^{(e)}$ | — | — | — | — | — | 17.0 |
| Properties | | | | | | |
| Heat Distortion, °F. at 264 psi | 400 | 402 | 402 | 405 | 424 | 402 |
| Notched Izod, ft.lbs./in. | 1.8 | 1.5 | 2.1 | 1.9 | 1.5 | 1.1 |
| Unnotched Izod, ft.lbs./in. | 11.1 | 5.5 | 11.0 | 9.5 | 9.3 | 8.5 |
| Warpage, room temp., mm. | — | 17 | — | — | — | .89 |
| Warpage, annealed at 350° F./30 min., mm | — | 22 | — | — | — | — |
| Flexural strength (10$^3$ psi) | 28 | 24 | 31.3 | 30.6 | 29.8 | 13.0 |
| Flexural molulus (10$^3$ psi) | 110 | 117 | 190 | 215 | 122 | 447 |
| Tensile strength (10$^3$ psi) | 18.2 | 16.5 | 21.5 | 21.6 | 20.1 | 7.9 |

$^{(a)}$VALOX 295, General Electric Co.
$^{(b)}$VITUF, Goodyear
$^{(d)}$DER 332, Dow Chemical
$^{(e)}$Copolycarbonate of 50—50 w/w tetrabromobisphenol-A/bisphenol A,13 parts (antimony oxide 80-Low density polyethylene 20), 4 parts.
$^{(f)}$Compounded on 3½" Egan side-fed extruder
$^{(g)}$Also contains 15 parts per hundred total composition of polyacrylate impact improver, Rohm & Haas Acryloid KM 330.

The foregoing results show that the glass content can be varied and that the addition of an oxirane compound provides property improvement. Furthermore, flame retardance is provided in Example 8, the Underwriters' Laboratory Bulletin 94 flame test rating being V-0 on a 1/16" specimen.

Other modifications of the above examples provide compositions within the scope of this invention.

For example, for poly(1,4-butylene terephthalate), substitute a 98/2 1,4-butylene terephthalate-1,4-butylene isophthalate copolyester, a 99/1 1,4-butylene terephthalate-1,4-butylene adipate copolyester or a 98/2 1,4-butylene terephthalate-glycerol terephthalate copolyesters.

Because of their excellent physical, mechanical, chemical, electrical and thermal properties the alloyed polyester compositions of this invention have many and varied uses. The compositions may be used alone as molding resins or mixed with other polymers and may contain additional, conventional ingredients as well as pigments and dyes, and the like.

Obviously, other modifications and variations of the present invention are possible in the light of the above teachings. It is, therefore, to be understood that changes may be made in the particular embodiments of this invention described which are within the full intended scope of the invention as defined by the appended claims.

I claim:

1. A reinforced thermoplastic composition which has a high deflection temperature under load at 264 psi and which molds into opaque, crystalline specimens in thin, thick and large/flat parts exhibiting improved control in warpage, said composition comprising:
(A) a stable blended resinous combination comprising:
 (i) from about 60 to about 90 parts by weight of a poly(ethylene terephthalate) resin and
 (ii) from about 40 to about 10 parts by weight of a poly(1,4-butylene terephthalate) resin or a copolyester thereof with a minor amount of an aliphatic or aromatic dicarboxylic acid or an aliphatic polyol;
(B) from about 5 to about 60 parts by weight per 100 parts by weight of said composition of reinforcing filamentous glass;
(C) an internal nucleating amount of sodium stearate, alone, or in further combination with
(D) an effective, property improving amount of an oxirane compound.

2. A composition as defined in claim 1 wherein said poly(ethylene terephthalate) component A.a. comprises 70 parts by weight, and said poly(1,4-butylene terephthalate) comprises 30 parts by weight of said combination and said glass component B comprises 30 parts by weight per 100 parts by weight of the total composition.

3. A composition as defined in claim 1 wherein said sodium stearate component C comprises from about 0.1 to about 1.0 parts by weight per 100 parts by weight of components A, B and C, combined.

4. A composition as defined in claim 3 wherein said sodium stearate component C comprises about 0.5 parts by weight per 100 parts by weight of components A, B, and C, combined.

5. A reinforced thermoplastic composition which has a high deflection temperature under load at 264 psi and which molds into opaque, crystalline specimens exhibiting improved control in warpage at mold temperatures in the range of 140°–160° F. in thin, thick and large/flat parts, said composition comprising:
(A) a stable, blended resinous combination comprising:
 (i) about 70 parts by weight of poly(ethylene terephthalate) resin, and
 (ii) about 30 parts by weight of poly(1,4-butylene terephthalate)resin;
(B) about 15 parts by weight per 100 parts by weight of said composition of reinforcing filamentous glass; and
(c) about 0.5 parts by weight of sodium stearate per 100 parts by weight of components A, B, and C combined.

6. A composition as defined in claim 1 which also includes a minor, effective amount of a flame retardant additive.

* * * * *